US012712348B2

(12) United States Patent
Shahin et al.

(10) Patent No.: US 12,712,348 B2
(45) Date of Patent: Aug. 18, 2026

(54) ELECTRONIC BRAKE SYSTEM

(71) Applicant: HL MANDO CORPORATION, Pyeongtaek-si (KR)

(72) Inventors: Hatem Shahin, Pfaffenhofen (DE); Kai Braun, Friedrichsdorf (DE); Lothar Wagner, Simmern (DE); Pawel Przybyla, Frankfurt am Main (DE)

(73) Assignee: HL MANDO CORPORATION, Pyeongtaek si (KR)

( * ) Notice: Subject to any disclaimer, the term of this patent is extended or adjusted under 35 U.S.C. 154(b) by 415 days.

(21) Appl. No.: 18/239,326

(22) Filed: Aug. 29, 2023

(65) Prior Publication Data

US 2024/0266815 A1 Aug. 8, 2024

(30) Foreign Application Priority Data

Feb. 8, 2023 (DE) ......................... 102023103088.4

(51) Int. Cl.

*H02G 3/14* (2006.01)
*H02G 3/08* (2006.01)
*B60T 13/74* (2006.01)
*B60T 17/00* (2006.01)

(52) U.S. Cl.

CPC ............... *H02G 3/14* (2013.01); *H02G 3/081* (2013.01); *B60T 13/74* (2013.01); *B60T 17/00* (2013.01)

(58) Field of Classification Search

CPC . H02G 3/14; H02G 3/08; H02G 3/081; B60T 13/74; B60T 17/00; H01H 9/02; H01H 9/22

USPC ...... 174/66, 67, 50, 53, 57, 58; 220/3.2–3.9, 220/4.02, 241, 242

See application file for complete search history.

(56) References Cited

U.S. PATENT DOCUMENTS 5,159,155 A * 10/1992 Nishihara .............. H02G 15/10 174/50
5,695,259 A 12/1997 Isshiki et al.
5,703,325 A * 12/1997 Yamaguchi ............ H02G 3/088 220/804
6,166,327 A * 12/2000 Saito ...................... H02G 3/088 220/374

(Continued)

FOREIGN PATENT DOCUMENTS

DE 69306520 4/1997
DE 102016204233 10/2016

(Continued)

OTHER PUBLICATIONS

German Patent Office Application No. 102023103088.4, Office Action dated Dec. 20, 2023, 6 pages.

*Primary Examiner* — Angel R Estrada
(74) *Attorney, Agent, or Firm* — LEE, HONG, DEGERMAN, KANG & WAIMEY

(57) ABSTRACT

Disclosed is an electronic brake system. The electronic brake system includes an electrical socket configured to accommodate an electrical component and a cover coupled to a lower portion of the electrical socket and configured to protect the electrical socket, wherein the cover includes a main body forming an exterior and a coupler provided on the main body to couple the cover to the electrical socket, the electrical socket includes a protrusion unit on the front of the electrical socket, and the coupler includes a latch therein, wherein the latch is coupled to the protrusion unit.

18 Claims, 3 Drawing Sheets

(56) References Cited

U.S. PATENT DOCUMENTS

| | | | | |
|---|---|---|---|---|
| 6,545,217 | B2 * | 4/2003 | Sato | H02G 3/088<br>174/64 |
| 7,138,580 | B2 * | 11/2006 | Boutin | H01R 13/447<br>174/92 |
| 12,384,308 | B2 * | 8/2025 | Akiba | H05K 5/0073 |

FOREIGN PATENT DOCUMENTS

| | | | |
|---|---|---|---|
| EP | 3944998 | A1 | 2/2022 |
| KR | 10-2005-0112014 | A | 11/2005 |

* cited by examiner

ELECTRONIC BRAKE SYSTEM

CROSS-REFERENCE TO RELATED APPLICATION

This application claims the benefit of German Patent Application No. 102023103088.4, filed on Feb. 8, 2023 in the German Patent and Trade Mark Office, the disclosure of which is incorporated herein by reference.

BACKGROUND

1. Field

Embodiments of the present disclosure relate to an electronic brake, and more specifically, to an apparatus including a cover configured to protect an electrical component.

2. Description of the Related Art

In vehicles, brake systems for performing braking are necessarily mounted, and various types of brake systems have been proposed for the safety of drivers and passengers.

In the conventional brake system, a method of providing a hydraulic pressure necessary for braking to a wheel cylinder through a mechanically connected booster when a driver presses a brake pedal is widely used. However, as the market demands to implement various braking functions precisely corresponding to operating environments of vehicles increase, electronic brake systems which electrically operate using pedal displacement sensors configured to detect displacement of brake pedals when drivers press the brake pedals have recently been spread widely.

The electronic brake system includes electrical components such as a driving motor, an electronic control unit (ECU), and a cable and includes an electrical socket which accommodates the electrical components. The electrical socket may be physically impacted from the outside and transmit the physical impact to the electrical components. As an example, stones, gravels, and road dirt may splash on the electrical socket, and animals may attack the electrical socket. The electrical socket including the electrical components is generally disposed in a place vulnerable to physical impacts, the electrical components accommodated in the electrical socket are vulnerable to physical impacts, and thus an apparatus capable of protecting the electrical socket and the electrical components is required.

RELATED ART

Patent Document

Korean Laid-open Patent No. 0-2005-0112014 (Published on Nov. 29, 2005)

SUMMARY

Accordingly, it is an aspect of the present disclosure to provide an electronic brake system capable of physically protecting an electrical socket which accommodates electrical components of the electronic brake system.

It is another aspect of the present disclosure to provide an electronic brake system capable of discharging water introduced to electrical components of the electronic brake system to the outside.

It is still another aspect of the present disclosure to provide an electronic brake system which is convenient to assemble so that a cover configured to protect electrical components of the electronic brake system is easily coupled to and decoupled from an electrical socket.

It is yet another aspect of the present disclosure to provide an electronic brake system in which a cover configured to protect electrical components of the electronic brake system is lightweight.

It is yet another aspect of the present disclosure to provide an electronic brake system in which costs of a cover configured to protect electrical components of the electronic brake system are low.

In accordance with one aspect of the present disclosure, an electronic brake system includes an electrical socket configured to accommodate an electrical component and a cover coupled to a lower portion of the electrical socket and configured to protect the electrical socket, wherein the cover includes a main body forming an exterior and a coupler provided on the main body to couple the cover to the electrical socket, the electrical socket includes a protrusion unit on the front of the electrical socket, and the coupler includes a latch therein, wherein the latch is coupled to the protrusion unit.

The main body may include a front member, a side member, and a lower member so that a space is provided in the main body, and an upper side and a rear side of the main body may be open.

The front member may include an extension member formed to extend from the same height as a side surface of the main body.

The latch may be provided on the front member of the main body and formed to protrude inward.

The coupler may include a first opening formed to pass through the front member so that the protrusion unit is easily coupled to and decoupled from the latch.

The coupler may include a second opening formed to pass through the extension member so that the electrical socket passes through the extension member.

The coupler may include an anti-rotation unit provided on the main body and formed to protrude inward so that the electrical socket is coupled to the main body and does not rotate.

The coupler may include a first guide unit provided on the side member and formed to protrude inward.

The coupler may include a second guide unit provided on the lower member and formed to protrude inward.

The electronic brake system may include a drain configured to discharge water contained in the main body to the outside.

The anti-rotation unit may be provided at at least one of the front member or the side member.

The anti-rotation unit may be formed so that one side of the anti-rotation unit is in contact with the front member, the other side thereof is in contact with the side member, and an inclined surface is formed from the side member to the front member.

The anti-rotation unit may be provided at at least one of an upper side or a lower side of the latch.

The extension member may be formed with a honeycomb structure.

The side member may include a rib formed to protrude outward.

The electrical component may include at least one among an actuator, an electronic control unit (ECU), or a cable.

The electronic brake system may be a caliper brake.

The electronic brake system may be a drum brake.

The cover may be formed of a plastic.

The cover may be formed of a metal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
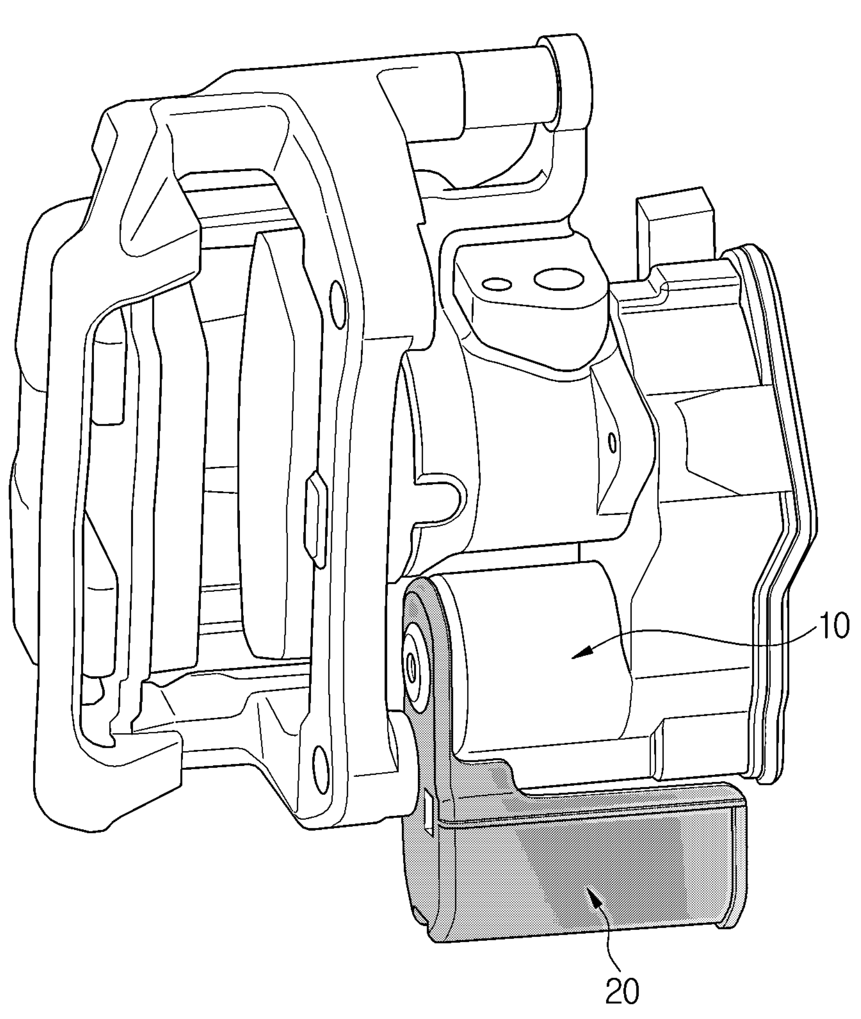
FIG. 1 is a schematic perspective view illustrating a state in which a cover is coupled to an electrical socket according to one embodiment of the present disclosure.

Hereinafter, embodiments of the present disclosure will be described in detail with reference to the accompanying drawings. The following embodiments are provided to sufficiently convey the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

FIG. 1 is a schematic perspective view illustrating a state in which a cover 20 is coupled to an electrical socket 10 according to one embodiment of the present disclosure. Referring to FIG. 1, an electronic brake system includes the electrical socket 10 which accommodates electrical components and the cover 20 coupled to a lower portion of the electrical socket 10 to protect the electrical socket 10. The present embodiment includes an electronic brake system provided as a caliper brake but is not limited thereto, and the present disclosure also includes an electronic brake system provided as a drum brake.

The electrical socket 10 accommodates the electrical components such as an actuator including an electric motor, an electronic control unit (ECU), and a cable.

Figure 2:
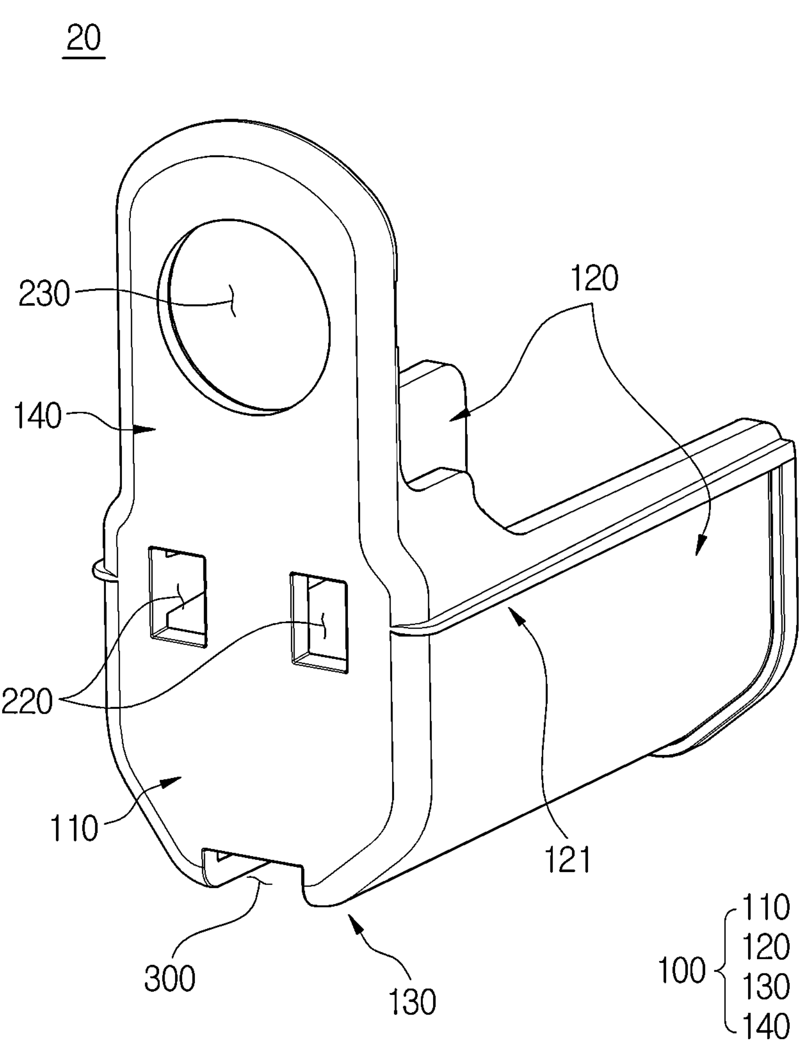
FIG. 2 is a front perspective view illustrating the cover according to one embodiment of the present disclosure.
Figure 3:
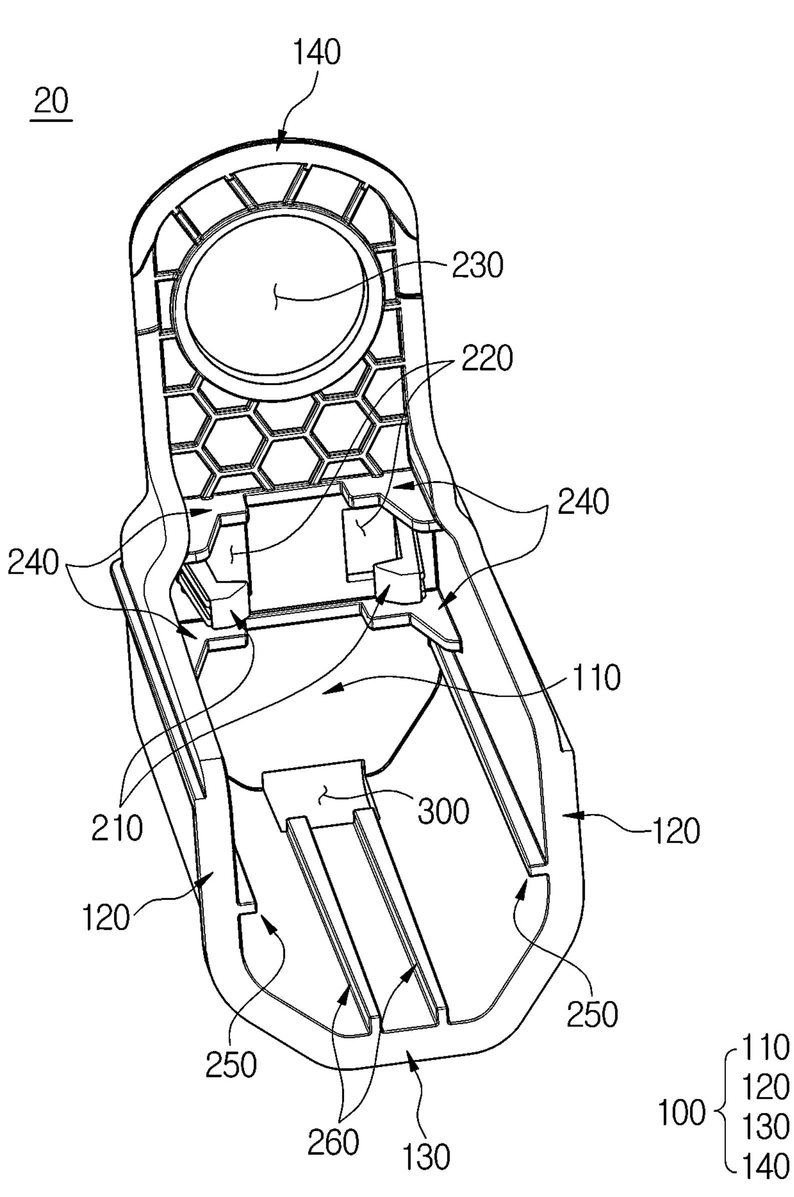
FIG. 3 is a rear perspective view illustrating the cover according to one embodiment of the present disclosure.

FIG. 2 is a front perspective view illustrating the cover 20 according to one embodiment of the present disclosure, and FIG. 3 is a rear perspective view illustrating the cover 20 according to one embodiment of the present disclosure. Referring to FIGS. 2 and 3, the cover 20 includes a main body 100 forming an exterior and a coupler 200 provided on the main body 100 to couple the cover 20 to the electrical socket 10.

The main body 100 includes a front member 110, side members 120, and a lower member 130 so that a space is provided in the main body 100, and an upper side and a rear side of the main body 100 are open. The front member 110 may also include an extension member 140 formed to extend upward from the same height as a side surface of the main body 100. Accordingly, by using the extension member 140, the space provided under the electrical socket 10 by the front member 110, the side member 120, and the lower member 130 is separately provided under a space occupied by the electrical socket 10. Accordingly, there are effects that external physical impacts do not directly affect the electrical socket 10 and a fluid is accommodated for a certain period of time without being in contact with the electrical socket 10 when the fluid such as rainwater is introduced into a brake system.

The extension member 140 may be formed with a honeycomb structure. The honeycomb structure is a structure to maximize bending or compressive strength of a thin and light material forming a hexagonal honeycomb structure. Since the extension member 140 should be inserted between a mounting bracket and the electrical socket 10, a thickness may be small compared to the front member 110, the side member 120, and the lower member 130. Accordingly, since the extension member 140 is formed with the honeycomb structure, the strength can be complemented, thereby minimizing deformation.

The electrical socket 10 includes protrusion units (not shown) on the front. Latches 210 may be provided in the coupler 200 and coupled to the protrusion unit (not shown). A coupling structure between the protrusion units (not shown) and the latches 210 is provided with a snap-fit structure. Accordingly, the electrical socket 10 and the cover 20 can be easily coupled or decoupled.

The latches 210 may be provided on the front member 110 of the main body 100 and formed to protrude inward. In this case, first openings 220 may be provided in the front member 110 to pass through the front member 110. The first openings 220 are provided as a pair of first openings 220 inside the latches 210 provided on the front member 110 of the main body 100 to allow the protrusion units (not shown) and the latches 210 to be easily coupled and decoupled.

A second opening 230 is formed to pass through the extension member 140 to allow the electrical socket 10 to pass through the extension member 140. Accordingly, the second opening 230 guides a coupling position when the cover 20 is coupled to the electrical socket 10 and also allows the electrical socket 10 to be latched on and coupled to the second opening 230.

Anti-rotation units 240 are provided in the main body 100 and formed to protrude inward so that the electrical socket 10 is coupled to the main body 100 and does not rotate. In this case, each of the anti-rotation units 240 may be provided on at least one of the front member 110 or the side member 120, or the anti-rotation units 240 may be provided so that one side is formed in contact with the front member 110, the other side thereof is formed in contact with the side member 120, and an inclined surface may be formed from the side member 120 to the front member 110. In addition, the anti-rotation unit 240 may be provided at at least one of an upper side or a lower side of the each of the latches 210.

Accordingly, when the electrical socket 10 and the cover 20 are coupled through the second opening 230, the latches 210, and the protrusion units (not shown), upward and downward movements of the cover 20 are restricted by the second opening 230, forward and rearward movements of the cover 20 are restricted by the latches 210 and the protrusion units (not shown), rotational movement of the cover 20 is restricted by the anti-rotation units 240 in an axial direction, and thus the electrical socket 10 and the cover 20 can be fixed.

First guide units 250 and second guide units 260 assist coupling between the cover 20 and the electrical socket 10. Each of the first guide units 250 is provided on one of the side members 120 and formed to protrude inward, and each of the second guide units 260 is provided on the lower member 130 and formed to protrude inward. In addition, guide grooves corresponding to the first guide units 250 and the second guide units 260 are provided in a side surface and a lower surface of the electrical socket 10. Specifically, in one embodiment of the present disclosure, one first guide unit 250 is provided on each of the side members 120 provided at left and right sides, and two second guide units 260 are provided in parallel on the lower member 130. Accordingly, when the cover 20 is coupled to the electrical socket 10, a coupling direction can be assisted, and the cover 20 and the electrical socket 10 can also be guided to be coupled.

Ribs 121 are formed to protrude outward from the side members 120. Specifically, in one embodiment of the present disclosure, the ribs 121 may be provided on the side members 120, formed from the front member 110 to ends of the side members 120 and from the ends of the side members 120 to the lower member 130. Accordingly, the stiffness of the side members 120 can be reinforced to prevent sagging of the side members 120.

A drain 300 may discharge water contained in the main body 100 to the outside. Specifically, in one embodiment of the present disclosure, the drain 300 is provided between the front member 110 and the second guide units 260 in the lower member 130. However, a size, a shape, and a position of the drain 300 are not limited to the embodiment of the present disclosure and may vary, and a plurality of drains 300 may be provided. In addition, the lower member 130 may be obliquely provided in a direction in which the drain 300 is provided so that a fluid contained in an inner space of the main body 100 is easily discharged through the drain 300.

The cover 20 may be formed of a plastic or metal. When the cover 20 is formed of the plastic, in order to have a mass of about 50 g, the plastic is formed of a combination material of polyamide6 (PA6) and glass fiber (GF), or formed of a material such as polyamide66 (PA66) or polybutylen terephthalate (PBT). In the case of the plastic, since the cover 20 is produced through an injection molding process, a cost can be significantly reduced. When the cover 20 is formed of the metal, the durability and strength of the cover 20 can be significantly increased.

The electronic brake system according to the present embodiment having such a configuration can physically protect the electrical socket 10 including the electrical components using the cover 20 provided with the main body 100, and since the coupler 200 including the latch 210, the first opening 220, the second opening 230, the anti-rotation unit 240, the first guide unit 250, and the second guide unit 260 are provided on the main body 100, an assembly of the cover 20 is convenient, and water introduced into the electrical components can be easily discharged to the outside through the drain. Since the configuration and manufacturing process of the cover 20 is simple, the marketability of the electronic brake system can also be improved by reducing the weight and cost of a brake.

As is apparent from the above description, one aspect of the present disclosure provides an electronic brake system capable of physically protecting an electrical socket which accommodates electrical components of the electronic brake system.

Another aspect of the present disclosure provides an electronic brake system capable of discharging water introduced to electrical components of the electronic brake system to the outside.

Still another aspect of the present disclosure provides an electronic brake system which is convenient to assemble so that a cover configured to protect electrical components of the electronic brake system is easily coupled to and decoupled from an electrical socket.

Yet another aspect of the present disclosure provides an electronic brake system in which a cover configured to protect electrical components of the electronic brake system is lightweight.

Yet another aspect of the present disclosure provides an electronic brake system in which costs of a cover configured to protect electrical components of the electronic brake system are low.

What is claimed is:

1. An electronic brake system comprising:

an electrical socket configured to accommodate an electrical component; and a cover coupled to a lower portion of the electrical socket and configured to protect the electrical socket, wherein the cover includes a main body forming an exterior and a coupler provided on the main body to couple the cover to the electrical socket, wherein the electrical socket includes a protrusion unit at a front of the electrical socket, and wherein the main body includes a front member, side members, and a lower member so that a space is defined therebetween wherein the space is open toward an upward and rearward direction of the main body, wherein the coupler includes a latch configured to be coupled to the protrusion unit, and wherein the latch is provided on a rear side of the front member of the main body and formed to protrude inward in the space.

2. The electronic brake system of claim 1, wherein the front member includes an extension member formed to extend from a same height as a side surface of the main body.

3. The electronic brake system of claim 1, wherein the coupler includes a first opening formed to pass through the front member so that the protrusion unit is coupled to and decoupled from the latch.

4. The electronic brake system of claim 2, wherein the coupler includes a second opening formed to pass through the extension member so that the electrical socket passes through the extension member.

5. The electronic brake system of claim 1, wherein the coupler includes an anti-rotation unit provided on the main body and formed to protrude inward so that the electrical socket is coupled to the main body and does not rotate.

6. The electronic brake system of claim 1, wherein the coupler includes a first guide unit provided on one of the side members and formed to protrude inward in the space.

7. The electronic brake system of claim 1, wherein the coupler includes a second guide unit provided on the lower member and formed to protrude inward in the space.

8. The electronic brake system of claim 1, comprising a drain configured to discharge water from the main body to an outside.

9. The electronic brake system of claim 5, wherein the anti-rotation unit is provided at at least one of the front member or the side member.

10. The electronic brake system of claim 5, wherein the anti-rotation unit extends between the front member and one of the side members such that an inclined surface of the anti-rotation unit is formed from the one side member to the front member.

11. The electronic brake system of claim 5, wherein the anti-rotation unit is provided at at least one of an upper side or a lower side of the latch.

12. The electronic brake system of claim 2, wherein the extension member is formed with a honeycomb structure.

13. The electronic brake system of claim 1, wherein the side members include a rib formed to protrude outward.

14. The electronic brake system of claim 1, wherein the electrical component includes at least one among an actuator, an electronic control unit (ECU), or a cable.

15. The electronic brake system of claim 1, comprising a caliper brake.

16. The electronic brake system of claim 1, comprising a drum brake.

17. The electronic brake system of claim 1, wherein the cover is formed of a plastic.

18. The electronic brake system of claim 1, wherein the cover is formed of a metal.

* * * * *